United States Patent [19]

Sheaffer

[11] Patent Number: 4,844,025
[45] Date of Patent: Jul. 4, 1989

[54] DUAL SPARK PLUG COMBUSTION CHAMBER

[75] Inventor: Benjamin L. Sheaffer, Fond du Lac, Wis.

[73] Assignee: Brunswick Corporation, Skokie, Ill.

[21] Appl. No.: 250,921

[22] Filed: Sep. 29, 1988

[51] Int. Cl.⁴ .............................................. F02P 15/02
[52] U.S. Cl. ...................................... 123/310; 123/661
[58] Field of Search ......................... 123/310, 638, 661

[56] References Cited

U.S. PATENT DOCUMENTS

| | | | |
|---|---|---|---|
| 4,116,179 | 9/1978 | Nagumo et al. | 123/310 |
| 4,481,910 | 11/1984 | Sheaffer | 123/73 R |
| 4,481,911 | 11/1984 | Sheaffer et al. | 123/73 R |
| 4,538,568 | 9/1985 | Fujikawa et al. | 123/310 |
| 4,635,591 | 1/1987 | Hledin | 123/310 X |

FOREIGN PATENT DOCUMENTS 1075106  4/1980  Canada .............................. 123/310

Primary Examiner—Tony M. Argenbright
Attorney, Agent, or Firm—Robert C. Curfiss

[57] ABSTRACT

In a two stroke internal combustion engine (2) having a pair of spark plugs (28, 30) for each cylinder (6), a particular height and spacing ratio of the spark gaps (32,34) have been found to produce misfire-free running during idle. The ratio h/H should be less than 0.5, where h is the height of the spark gaps (32, 34) above the squish surface (20) or the top (60) of the cylinder sidewalls, and H is the height of the top (36) of the combustion chamber above such surface. The ratio d/D should be in the range of about 0.25 to 0.35, where d is the distance between the spark gaps (32, 34), and D is the inner diameter of the cylinder (6).

6 Claims, 2 Drawing Sheets

DUAL SPARK PLUG COMBUSTION CHAMBER

BACKGROUND AND SUMMARY

The invention relates to two stroke engines, and more particularly to those with two or more spark plugs per combustion chamber.

Two stroke engines in general exhibit poor idling, and are subject to numerous misfires. This causes rough and noisy running at idle, higher hydrocarbon emissions, and higher idle fuel consumption. In the present invention, it has been found that a particular type of positioning of dual spark plugs in the combustion chamber produces a misfire-free idle in loop-scavenged two stroke engines, including direct injection, i.e. cylinder head injection, and intake manifold injection or carburetion.

Two stroke engines with dual spark plugs are known in the art, for example as shown in U.S. Pat. No. 4,538,568. In this patent, torque is maximized when the ratio d/D is in the range of about 0.35 to 0.45, where d is the distance between the two ignition plugs, and D is the inner diameter of the cylinder.

In the present invention, it has been found that a different ratio d/D is needed to produce misfire-free idle. Furthermore, it has been found that a particular height ratio h/H is desired to produce misfire-free idle, where h is the height of the spark gaps above the squish surface, or top of the cylindrical sidewall, and H is the height of the combustion chamber above such surface. It has been found that the ratio h/H should be less than about 0.5.

DETAILED DESCRIPTION

Figure 1:
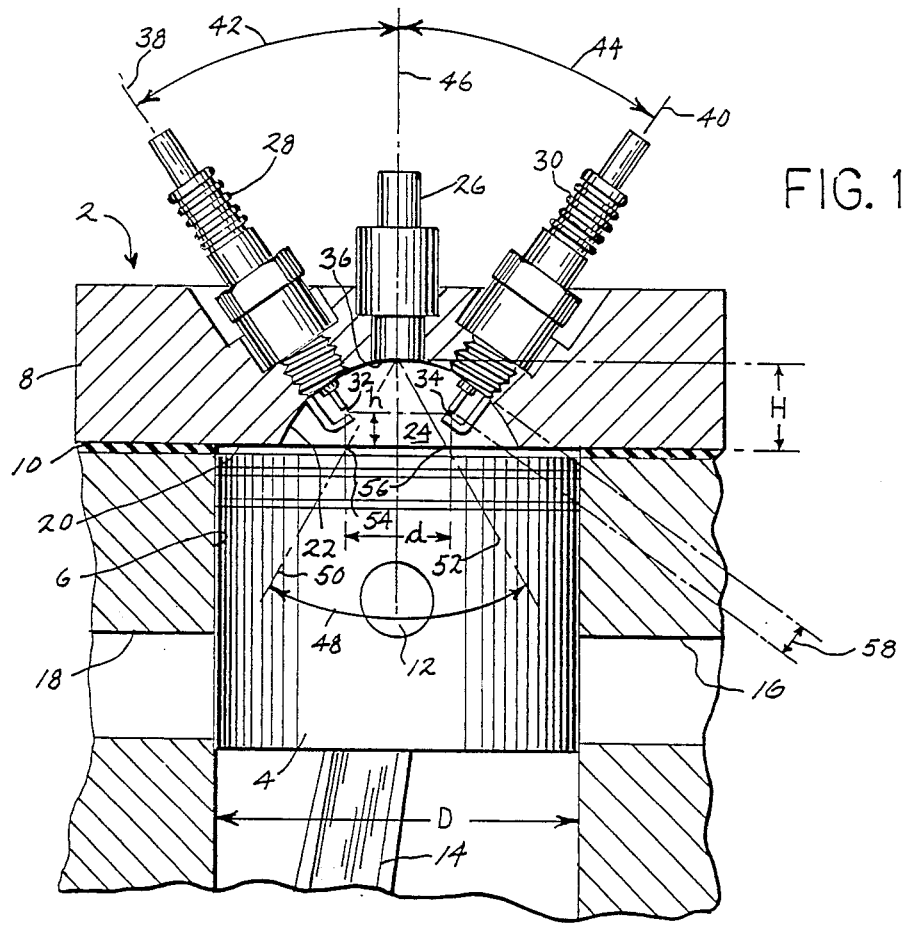
FIG. 1 is a partial sectional schematic view of a dual spark plug combustion chamber in accordance with the invention.

FIG. 1 shows one cylinder of a multi-cylinder two stroke internal combustion engine 2, for which further reference may be had to above noted U.S. Pat. Nos. 4,538,568 and to my prior U.S. Pat. Nos. 4,481,910 and 4,481,911, all incorporated herein by reference. Piston 4 is reciprocal in cylinder 6 having cylindrical sidewalls extending upwardly to a cylinder head 8 mounted on the cylinder block and sealed thereto by gasket 10. The piston has a wrist pin 12 journaled to a connecting rod 14 which in turn is journaled to a lower crankshaft (not shown) in the crankcase. The cylinder includes an intake port 16 and an exhaust port 18, all as is well known in the art.

The cylindrical sidewalls of cylinder 6 extend upwardly to gasket 10 and the underside 20 of cylinder head 8. Underside 20 provides a squish surface extending laterally inwardly to concave dome portion 22 of the cylinder head. The cylinder head and the upper portion of cylinder 6 form the combustion chamber 24 above piston 4. During the upward charging stroke of piston 4, the fuel-air mixture in combustion chamber 24 is compressed, including compression against squish surface 20 which enhances compression and drives such compressed mixture radially inwardly. In FIG. 1, direct cylinder head injection is provided by fuel injector 26. In this embodiment, intake port 16 and/or other boost ports supply intake combustion air. Alternatively, the crankcase manifold is provided with a fuel injector or a carburetor, and a fuel-air mixture is introduced at intake port 16 and/or appropriate boost ports.

A pair of spark plugs 28 and 30 are mounted in cylinder head 8 and extend into combustion chamber 24 and have respective spark gaps 32 and 34 at a height above squish surface 20. The top of combustion chamber 24 at upper dome surface 36 has a height H above squish surface 20. Spark gaps 32 and 34 are spaced from each other by a distance d. Cylinder 6 has an inner diameter D. It has been found that in order to produce misfire-free idle, the ratio h/H should be less than about 0.5, and the ratio d/D should be in the range of about 0.25 to 0.35.

In the particular embodiment shown, the spark plugs extend along respective directions 38 and 40 at respective angles 42 and 44 relative to the central axis 46 of cylinder 6. Each of angles 42 and 44 is about 35°. Fuel injector 36 has a spray angle 48 of about 60° to provide spray pattern outer edges 50 and 52 each extending along a direction about 30° from vertical axis 46. Each of directions 50 and 52 intersects the respective spark plug centerline 38 and 40 at a respective point 54 and 56 slightly below inwardly of respective spark gaps 32 and 34. Inner diameter D is 3.375 inches, and the vertical travel stroke of piston 4 is 2.65 inches. The spark gap projection 58 of each spark plug is 0.375 inch.

The combustion chamber configuration of FIG. 1 was tested by counting the number of misfires for 360 consecutive revolutions of the engine. For the structure above described, there were no misfires. In a structure with only a single spark plug on the exhaust port side, and with a 0.375 inch spark gap projection, there were nine misfires. For a configuration with a single spark plug on the boost port side of the cylinder, and with a 0.375 inch spark gap projection, there were twenty-five misfires. In a configuration with a single spark plug on the exhaust port side of the cylinder, and with a 0.322 inch spark gap projection, there were ten misfires. In a configuration with a single spark plug on the exhaust port side of the cylinder, and with a 0.428 inch spark gap projection, there were thirteen misfires. In a configuration with crankcase manifold injection, rather than the direct cylinder injection of FIG. 1, and with dual spark plugs and with 0.375 inch spark gap projection, there were no misfires.

Figure 2:
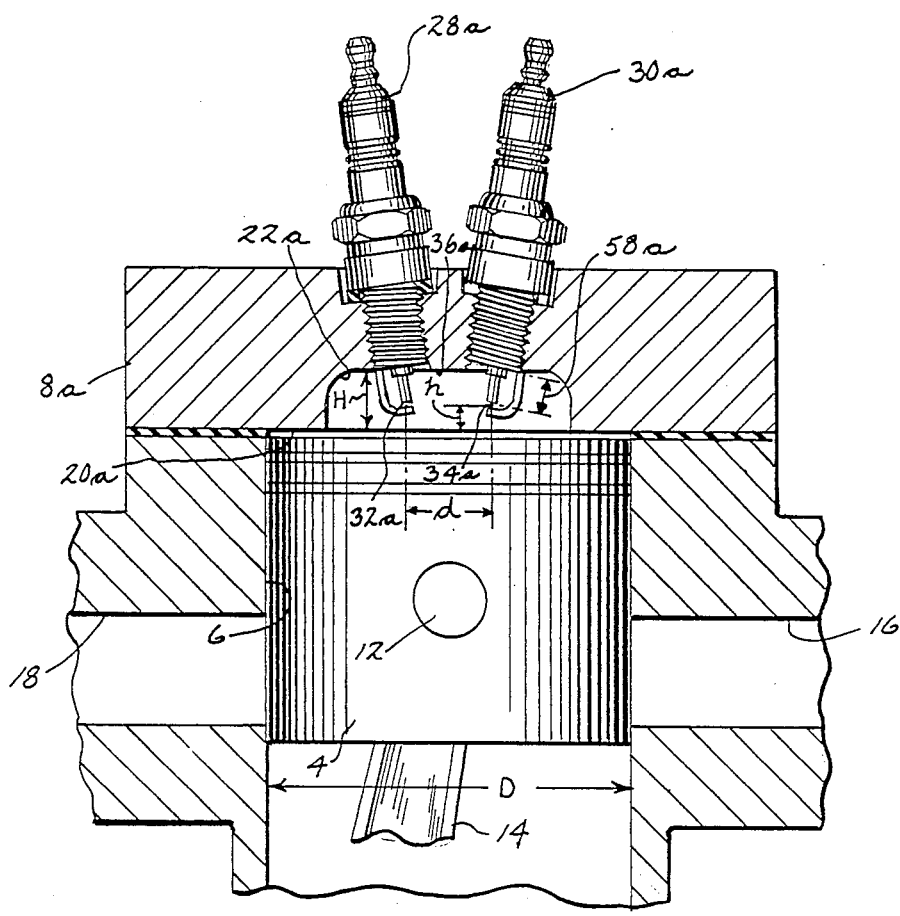
FIG. 2 shows an alternate embodiment of FIG. 1.

FIG. 2 shows a combustion chamber configuration similar to FIG. 1, but with a different dome configuration 22a in cylinder head 8a. FIG. 2 uses like reference numerals from FIG. 1 where appropriate to facilitate clarity. Spark plugs 28a and 30a have spark gaps 32a and 34a separated by distance d. Spark gaps 32a and 34a have a height h above squish surface 20a. The top of the combustion chamber at the top of dome portion surface 36a has a height H above squish surface 20a. The configuration in FIG. 2 uses crankcase manifold injection, with a fuel injector such as 26 from FIG. 1 injecting fuel into the crankcase manifold, for example in place of carburetor 17 in FIG. 1 of above incorporated U.S. Pat. No. 4,481,910. The configuration of FIG. 2 was tested for 360 consecutive revolutions of the engine, with the dual spark plugs as shown and with 0.375 inch spark gap projection 58a, and there was no misfires.

Figure 3:
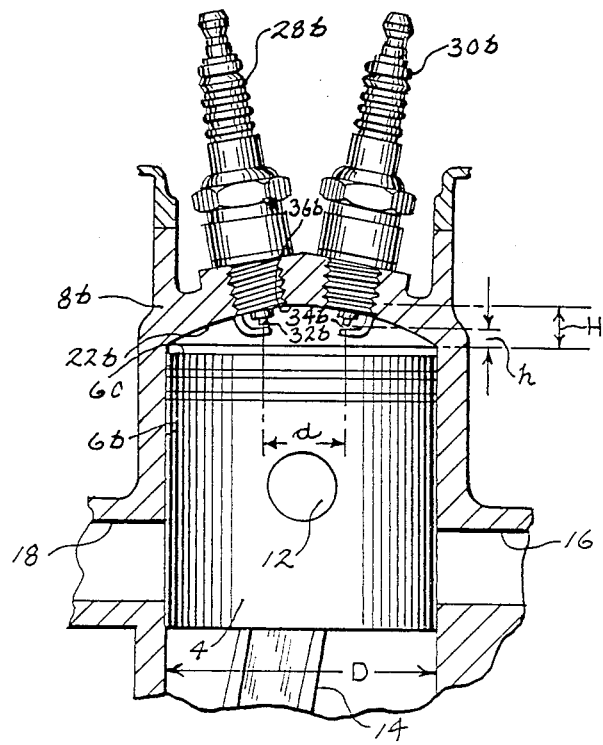
FIG. 3 shows another alternate embodiment of FIG. 1.

FIG. 3 shows another alternate embodiment, and like reference numerals are used from FIGS. 1 and 2 where appropriate to facilitate clarity. Instead of a separate cylinder head, the structure in FIG. 3 includes an upper dome portion 8b integral with the cylinder block defining cylinder 6b. Dual spark plugs 28b and 30b have spark gaps 32b and 34b separated by distance d. The inner diameter of cylinder 6b is D. Spark gaps 32b and 34b have a height h above the top 60 of the cylindrical sidewall of cylinder 6b where such sidewall meets the inner surface 22b of dome portion 8b. The top of the combustion chamber at the top 36b of the inner surface of the dome portion has a height H above the top 60 of the cylinder sidewall.

It is recognized that various equivalents, alternatives and modifications are possible within the scope of the appended claims.

I claim:

1. A two stroke internal combustion engine having a piston reciprocal in a cylinder having cylindrical sidewalls meeting an upper head at a squish surface, said head and the upper portion of said cylinder defining a combustion chamber above said piston, said combustion chamber having a height H above said squish surface, a pair of spark plugs in said head and extending into said combustion chamber and having spark gaps at a height h above said squish surface, wherein the ratio h/H is less than about 0.5.

2. The invention according to claim 1 wherein said cylinder has an inner diameter D, said spark gaps are spaced from each other by a distance d, and wherein in combination the ratio d/D is in the range of about 0.25 to 0.35.

3. The invention according to claim 2 wherein said spark plugs are on opposite sides of the central axis of said cylinder defining the direction of reciprocation of said piston, and wherein each spark plug extends along a direction at about a 35° angle relative to said axis, and wherein each of said spark plugs has inner electrodes extending downwardly and inwardly towards each other in said combustion chamber, each at an angle of about 35° relative to said axis.

4. The invention according to claim 3 comprising a fuel injector in said head between said spark plugs and having a spray angle of about 60° to provide an outer spray edge at an angle of about 30° relative to said axis on each side of said axis, wherein the outer edge of said spray extends along a line intersecting the centerline of each of said spark plugs at a point slightly below and inwardly of respective said spark gaps.

5. A two stroke internal combustion engine comprising a piston reciprocal in a cylinder having cylindrical sidewalls extending upwardly to an upper dome portion thereabove, said dome portion and the upper portion of said cylinder defining a combustion chamber above said piston, said combustion chamber having a height H above the top of said cylindrical sidewalls, a pair of spark plugs in said dome portion and extending into said combustion chamber and having spark gaps at a height above the top of said cylindrical sidewalls, where the ratio h/H is less than about 0.5.

6. The invention according to claim 5 wherein said cylinder has an inner diameter D, said spark gaps are spaced from each other by a distance d, and wherein in combination the ratio d/D is in the range of about 0.25 to 0.35.

* * * * *